United States Patent Office 3,491,020
Patented Jan. 20, 1970

3,491,020
SWEETENING PROCESS UTILIZING A CATALYST COMPOSITE WITH AVAILABLE LATTICE OXYGEN
Norman L. Carr, Allison Park, Harry A. Hamilton, Natrona Heights, and Meredith M. Stewart, Pittsburgh, Pa., assignors to Gulf Research & Development Co., Pittsburgh, Pa., a corporation of Delaware
No Drawing. Filed Feb. 14, 1967, Ser. No. 615,910
Int. Cl. C10g 27/00
U.S. Cl. 208—189     7 Claims

ABSTRACT OF THE DISCLOSURE

A low temperature hydrocarbon sweetening process utilizes a catalyst composite comprising iron, silica and oxygen for the selective oxidation of mercaptans to disulfides. The catalyst is prepared by adding a solution of ferric chloride to a cation-free silica sol having a pH less than 5, raising the pH to about 8 and washing, drying and calcining the resultant gel. The calcined composite may be impregnated with an alkali metal, selenium or mixtures thereof. Oxygen becomes available from the lattice structure of the catalyst for oxidation of adsorbed mercaptans.

Background of the invention

Petroleum products contain undesirable sulfur derivatives such as mercaptans and thiophenols which impart to such products and their distillates an objectionable odor and corrosiveness. Distillates containing such objectionable sulfur derivatives are known as "sour" distillates and processes for oxidizing mercaptans in these "sour" distillates are known as "sweetening."

The sweetening process for the oxidation of mercaptans to disulfides is usually associated with gasoline distillates or lighter materials such as LPG, natural gasoline, naphthas, etc., where the odor and corrosive properties of the mercaptans are undesirable. By oxidation these mercaptans are converted to disulfides, which are often not objectionable. The disulfides are usually present in such small amounts that they are allowed to remain in the finished product. In this case, the "sweetened" hydrocarbon has the same sulfur content as the untreated stock.

A gasoline is "sweet" or "doctor" negative by definition, when no dark discoloration occurs at the interface after shaking it with an equal volume of doctor solution (an alkaline plumbite solution) and a small amount of sulfur. The test is sensitive to one part of the hydrogen sulfide or active mercaptan in 100,000 parts of distillate.

The prior art teaches that sour distillates may be sweetened by:

(1) Solution treating (caustic, plumbite, copper)
(2) Adsorption
(3) Ion exchange
(4) RSH removal by reaction with supported metals at elevated temperature.

The disadvantages presented by these processes are:

(1) Separation of liquid treating agents
(2) Contamination of process stream
(3) Inefficient
(4) High reaction temperature
(5) Undesirable side effects
(6) Cost These and other disadvantages of the prior art are overcome by a new and improved process for the complete or substantially complete deactivation of mercaptans and thiophenols contained in a hydrocarbon whereby the catalytic composite of the process of the instant invention, as described below, is employed for the low temperature oxidation of mercaptan sulfur to a non-mercaptan sulfur compound, mainly which is disulfide sulfur.

Summary of the invention

The catalyst employed in this invention is a high surface area cogelled composite consisting essentially of iron, silica and oxygen, which has utility both as a catalyst and an adsorbent. In a broad aspect, this invention contemplates a process for the preparation of a cogelled composition which comprises combining a cation-free silica sol with an aqueous solution of a Group VIII metal salt, causing gelation of the resulting mixture and recovering a cogelled chemical composite having catalytic and adsorbent properties.

It is an object of this invention to prepare a high surface area composition. It is another object of this invention to prepare a high surface area composition which is substantially free of alkali and alkaline earth contaminants. It is another object of this invention to prepare a catalyst which can be used to sweeten sour hydrocarbons. It is yet another object of this invention to prepare a catalyst capable of selective low temperature oxidation. It is another object of this invention to prepare a composition which has utility as an adsorbent. Other objects and advantages of the invention will appear hereinafter.

In accordance with the invention, a dilute silica sol, substantially free of cationic impurities is mixed with an aqueous solution of a compound capable of yielding Group VIII metal ions in solution, such as ferric chloride. Gelation of the resulting mixture is accomplished by raising the pH with a suitable base such as ammonia. Once the gel has set, it is washed to substantially remove any soluble salts which have formed and any residual base. To prepare this resulting gel for catalytic or adsorbent use, it can be dried and calcined. Although catalytically active materials may be added prior to drying and calcining, it is within the contemplation of this invention to impregnate the gel after it has been calcined with catalytically active material and again drying and calcining.

In the practice of the process of the instant invention it is important that the silica sol be free or substantially free of cationic impurities. By cationic impurities are meant metallic cations, especially the alkali metals as, for example, sodium, and the alkaline earth metals as exemplified by calcium. When such metallic cations are present in the silica sol they cannot readily be removed at later stages of the catalyst preparation and become included in the catalyst structure, detracting from the integrity thereof. The effect of such metallic cations is to inhibit the catalytic properties of the final product.

A number of methods are available for the preparation of a cation-free, dilute silica sol. Preferably, a dilute solution of water glass is flowed, as by percolation or pumping, through a bed of protonated cation-exchange material to recover an effluent dilute silica sol substantially free of cationic impurities. Any soluble silicate can be used in this method but the sodium silicate solutions commonly known in the art as "water glass" are preferred since they are inexpensive and readily available.

The silicate solution used in preparing the cation-free silica sol must be dilute, containing no more than the equivalent of about 5 percent silica and preferably between 1 and 3 percent silica. Solutions more or less concentrated may be employed satisfactorily, the upper and lower limits being that concentration which will pass through the ion exchange column without gelling and that volume of liquid which can be conveniently handled, respectively.

Any solid cation-exchange material insoluble in water may be used to prepare the protonated silica sol. Cation-exchange resins of high cation-exchange capacity such as sulfonated phenol formaldehyde resins or divinylbenzene cross-linked sulfonated polystyrene resins, like Amberlite IR–120 (manufactured by Rohm and Haas) have given excellent results in the production of dilute silica sols. Other cation-exhange materials, such as sulfuric acid-treated coal or wood, can be used. In every instance the ion-exchange material must be in acid form. It may be placed in this form by washing with a suitable strong acid such as sulfuric acid or hydrochloric acid. Any residual free acid may be washed from the ion-exchange material with water.

In producing the cation-free silica sol, a single bed of cation-exchange material may be employed or a plurality of beds arranged in series or in parallel or both can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above for the initial preparation of the ion-exchange material. To determine when a bed is spent, it is convenient to measure continuously or from time to time the pH or the conductivity of the effluent silica sol. The pH of a satisfactory sol is in the neighborhood of 3 and its specific conductance is in the neighborhood of $10^{-4}$ to $10^{-5}$ ohm$^{-1}$ cm.$^{-1}$. When the pH rises to about 5, the processing must be interrupted for regeneration and, advantageously, permutation of the beds.

The pH of the silica sol is maintained at a level less than 5 to prevent premature gelation of the sol. As indicated below, dilute, cation-free silica sols are unstable, tending to gel, which tendency is greatly accelerated when the pH is raised. Further, a rise in pH of the effluent silica sol indicates that the ion-exchange bed is no longer functioning efficiently in exchanging protons for cationic impurities.

Maintaining the pH at less than 5 then, tends to maximize the stability of the silica sol while minimizing the concentration of cationic impurities.

Silica sols, substantially free of cationic impurities, as prepared by other methods can also be employed within the scope of this invention. For example, satisfactory dilute cation-free silica sol can be made by hydrolysis of ethylorthosilicate or of silicon tetrachloride.

According to the method of this invention, the dilute silica sols, substantially free of cationic impurities, must be mixed promptly with the aqueous solution of the compound that yields the desired Group VIII metal in solution; that is, the silica sol must be freshly prepared.

The use of freshly prepared silica sol is very important within the contemplation of this invention and to understand the importance of this aspect it is necessary to understand the nature of "water glass" and the nature of the protonated silica sol prepared therefrom. "Water glass" is prepared by fusing silica with sodium carbonate, the product is a colloidal suspension of silica in sodium silicate. When this suspension of silica in sodium silicate is treated by passage through a protonated ion-exchange column, the resulting product is a colloidal suspension of silica in silicic acid and has a pH of about 3. This silica sol then, wherein the colloidal particles of silica are very finely dispersed, is the starting material for this invention. The silica sol in this form is relatively stable in that it does not gel immediately but on standing changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles.

When the silica sol used has been freshly prepared, the size of the colloidal particles is very small, the molecular weight of the silicic acid very low and it is these characteristics of the starting silica sol which permit the final composition to have an extremely high surface area. It is a preferred practice, therefore, when the silica sol has been prepared by flowing a soluble silicate through an ion-exchange resin bed, to flow the effluent cation-free silica sol directly into an aqueous solution of a substance which yilds Group VIII metal ions.

For the practice of this invention, the salt of the Group VIII metal employed must be capable of undergoing metathesis with the alkali added, i.e., capable of being precipitated as the metal hydroxide or hydrous metal oxide, as the case may be. Examples of the salts of Group VIII metals which may be successfully employed in this invention are the nitrates and sulfates of cobalt and nickel and the chloride of iron. The composition which we prefer to use in the practice of the instant invention is ferric chloride. It is readily soluble in water, is inexpensive, is readily available in quantity, easily forms an insoluble gelatinous precipitate in the presence of alkali such as ammonia and yields a finished product of outstanding properties. Although a preferred mode of operation is to use the Group VIII metals in their higher oxidation states, it is within the contemplation of this invention to employ soluble salts of the Group VIII metals in their lower oxidation states, form the hydroxide with alkali and then oxidize the metal ion to its higher oxidation state.

When the silica sol is added to the solution of Group VIII metal cations, mixing should be sufficiently thorough to produce a completely homogeneous liquid. Because cation-free dilute silica sols are unstable, having a tendency to gel, it is essential, as indicated above, that the silica sol be used soon after its preparation, i.e., within 12 hours and preferably within 1 hour after its preparation. As indicated above, the preferred practice is to flow the silica sol directly from the bed of ion exchange resin into an aqueous solution of Group VIII metal cations.

Once the mixture has been thoroughly homogenized, gelation is brought about by increasing the pH of the mixture. This may be done conveniently by addition of aqueous ammonia with stirring or addition of gaseous ammonia, as through a sparger. The alkaline agent chosen for raising the pH of the mixture of silica sol and the solution containing Group VIII metal cations should be such as to leave no harmful residue in the resulting composition. The alkali metals and alkali metal hydroxides and such compounds therefore are not used, for they leave a residue of alkali metal in the product difficult to remove by washing. Ammonia, on the other hand, is cheap, easily available, and leaves no residue upon calcination of the resulting gel. Other bases such as trimethyl ammonium hydroxide, hydrazine or quinolinium hydroxide, may be employed, but they are expensive and are considered to have no particular advantage. When salts of nickel and cobalt and such metals are used as the source of Group VIII metal cations, ammonia cannot be used to adjust the pH since these metals form complex ammines in admixture with ammonia. A convenient means of adjusting the pH when salts of metals such as nickel and cobalt are used is to add ammonium bicarbonate.

On addition of the base to the Group VIII metal cation-silica sol solution, a slurry is formed consisting of a gelatinous precipitate and water. Although this gelatinous precipitate can be removed at will, we prefer to allow it to stand overnight to assure complete precipitation. The precipitate can be separated from the supernatant liquid in any convenient manner as, for example, by filtration. The precipitate is then washed with water to remove any contaminants. This washing process advantageously can be continued until conductivity measurements reach a constant level.

Once the precipitate has been washed free of contaminants, it can be dried and calcined. If desired, however, it can be impregnated before drying or before calcining with promoters, catalysts and the like. To composite the catalyst with the promoters of the process of the instant invention, any conventional procedure for the preparation of a multicomponent catalyst may be used. Preferably, the gelatinous precipitate prepared as specified above is, after washing, dried, calcined and impregnated with a promotor suitable for the process of the instant invention. The gelatinous precipitate can be dried, for example, in a forced-draft oven, at a temperature in the range of from 200° to 300° F. over a period of from 10 to 30 hours. The dried product can then be calcined in air at a temperature of from 800° to 1000° F. over a period of from 10 to 20 hours, preferably at from about 850° to 950° F. for from about 8 to 16 hours, to form the catalyst of the instant invention.

Although the catalyst can be impregnated with the promoting agents of the process of the instant invention at any time after the gelatinous precipitate has been formed, it is a preferred practice to impregnate the catalyst with the promoting agent after calcination. This procedure assures the integrity of the catalyst structure and also admits of greater latitude and convenience should it become desirable to change the promoting agent. It is to be particularly noted that the catalyst is complete in itself once it has been calcined and that promoting agents are used to enhance the inherent catalytic properties. To optimize the properties of the catalyst composite, the promoting agent, in a preferred embodiment, is not only added after the catalyst structure is established but is selected so as to combine with the catalyst via terminal chemical bonds, leaving the catalyst structure substantially undisturbed.

As will be shown below, this catalytic composite has utility as a lowe temperature oxidation catalyst and an adsorbent for oxygen-, sulfur- and nitrogen-containing compounds. The general use of the composite is for the removal and/or reaction of non-hydrocarbon constituents from natural or synthetic petroleum fractions. Another use is for the low temperature oxidation of hydrocarbons to produce oxygenates, light paraffins and olefins.

In one embodiment of the instant invention, the catalytic composite described above and prepared as in Example I below can be used in an improved method for sweetening sour hydrocarbons. More particularly the catalytic composite can be used for selectively oxidizing mercaptan sulfur, which is contained in a hydrocarbon, to form disulfide sulfur, at low temperatures.

We have found that if a petroleum distillate containing mercaptans is subjected, at a suitable temperature, to contact with air or another suitable source of oxygen in the presence of the cogelled catalytic composite of the process of the instant invention, such mercaptans are converted to alkyl disulfides or other noncorrosive compounds having no offensive odor and the distillate is thus "doctor" negative.

The contact treatment with air or other suitable oxygen source in the presence of the catalytic composite described above can be carried out at a temperature as low as 0° F. to 200° F. The preferred temperature is in the range of from 80° F. to 125° F. The process can be carried out at a pressure ranging from atmospheric to 500 p.s.i.g. The preferred range of pressure is from 25 to 100 p.s.i.g.

It is advantageous to bring the air or oxygen source and the distillate into intimate contact with each other prior to contact with the catalyst. The purpose of this oxygen addition is to replenish the oxygen removed from within the catalyst structure during the oxidation reaction. The catalytic composite contains sufficient oxygen within its structure to permit at least one complete cycle of a practical size without the addition of any oxygen whatever to the feedstock. The addition of oxygen extends the practical working life of the catalyst and reduces the frequency of regeneration. The oxygen concentration of the feedstock may range then, from that naturally present to that oxygen concentration resulting from complete saturation of the feedstock with air. Although a preferred mode of operation, saturating the feedstock with air is not critical within the contemplation of this invention; this air saturation eliminates any need for such control or metering apparatus as would be necessary if the air or oxygen concentration were critical. It is also desirable and necessary for repeated use to subject the composite catalyst to an oxidation treatment for reactivation when it becomes spent. The specific method is discussed later.

We have found that the new, very high surface area catalyst comprising a cogelled chemical composite of iron, oxygen and silica is a highly effective catalyst for the selective oxidation of mercaptans to disulfides. The catalytic composite is a chemical mixture, comprising iron, oxygen and silica whose structure is amorphous and wherein the form or forms in which the components exist in the catalyst are unknown. The nature of the catalyst is apparently such that oxygen is readily available from within the lattice structure for oxidation of adsorbed mercaptans. Not all transition metals are operable to the extent of iron; thus silica-alumina was found to be inoperative at the same conditions under which the catalysts of this invention were found effective, chromia-alumina was found to be inferior and compounds such as the molecular sieves were also found to be inoperative in the process of this invention.

Not all concentrations of the Group VIII metals applicable to the practice of the instant invention can be employed under the process conditions herein set forth. At metal concentrations in excess of about 60 percent by weight the catalyst demonstrates crystalline characteristics and displays an attendant loss of desirable properties. For this reason, it is desirable to maintain the Group VIII metal concentration in the catalyst in the range of from about 10 percent to about 60 percent by weight, preferably from about 15 to 40 percent.

The catalyst effect of the cogelled catalytic composite is greatly enhanced when promoted with an oxide of a metal selected from the alkali metals and selenium. The preferred alkali metal oxide promoter is potassium oxide. The metal oxide promoter is preferred combined with the cogelled catalytic composite of the instant invention after it has been calcined. For this purpose the composite is, after it has been washed and dried, calcined at a temperature of from about 800° to 1000° F. for about 16 hours, preferably from about 850° to 950° F. for about 16 hours. Once the composite has been calcined it can be impregnated with the desired promoter. For this purpose any convenient mode of impregnation can be employed. We prefer, however, to employ an aqueous solution of a compound of the desired promoting agent which will leave, on decomposition by thermal treatment, a deposit of the promoting agent in an active form, as for example, the oxide. We have found it convenient, therefore, to impregnate the composite with aqueous selenic acid, where selenium is the promoter, and with an aqueous solution of an alkali metal nitrite, as for example, potassium nitrate, when an alkali metal is the promoting agent.

When selenium is the desired promoter, the concentration of the selenic acid solution is adjusted so as to yield a deposit of from 0.1 to 10.0 percent of selenium, calculated as the element, based on the catalyst weight. We prefer to obtain a catalyst containing from about 5.0 to 10.0 weight percent of selenium, desirably about 5 percent. The alkali metal deposit on the composite is calculated so as to lie in the range of from 0.05 to 5.0 weight percent based on the composite, preferably from 2 to 5 weight percent. We have found that a catalyst containing about 1 percent by weight of potassium is highly effective in a process for sweetening hydrocarbons.

Prior to impregnation the calcined composite can be broken up to any convenient size as, for example, 6–10 mesh. This broken up composite can then be contacted with the solution of promoting agent, the impregnation with this solution being carried to the point of incipient wetness. The composite can then be dried in any convenient manner and for this purpose we use a temperature in the range of from 200° to 300° F. for a period of about 10 to 30 hours. Once the impregnated composite has been dried it can be calcined. The temperature at which the impregnated composite is calcined is dependent upon the impregnating agent. Since selenium is volatile at higher temperatures, the selenium impregnated composite is calcined at a temperature in the range of from 500° to 750° F. for a period of from about 8 to 24 hours, preferably from about 550° to 700° F. for about 16 hours. In the case where the composite is promoted with an alkali metal it can be calcined at a temperature of from about 800° to 1000° F. for from about 8 to 24 hours, preferably from about 850° to 1000° F. for about 10 hours.

The promoted catalyst is not affected by a relatively high mercaptan content nor are there any unwanted side reactions such as accumulation of sulfur compounds, gumming or coking—the product is also water white. The catalyst does lose its activity, however, possibly as a result of a diminished supply of adsorbed oxygen within the catalyst and adsorption of by-product water. For this reason it is advantageous to employ multiple reactors which are alternately on stream. This permits the reactivation of one catalyst bed while the other or others continue to function. The catalyst can be reactivated by means of a thermal purge in the range of from about 500° to 800° F. with an oxygen-containing gas. We have found that the highest catalytic activity is achieved by a short-time activation with air at atmospheric pressure. Long activation periods and/or activation under pressure have the effect of reducing catalytic activity. Where the catalytic composite of Example I below is employed we have found that an effective activation resulted from passing air at atmospheric pressure over the catalyst bed at a temperature of about 500° F. for about 40 minutes. The alkali metal oxide promoted catalyst, for example a potassium oxide promoted catalyst, can be reactivated by heating to a temperature in the range of from about 500° to 800° F. with an air or air-flue gas mixture. The selenium oxide-promoted catalyst is similarly reactivated but at a temperature in the range of from about 500° to 700° F., since selenium is volatile at higher temperatures. The catalyst should not be exposed to steam in reactivating insofar as steam regeneration tends to reduce the catalyst activity. The reactivation of the catalyst is not to be confused with the type of oxidative regeneration common in the cracking and hydrocracking art. The main purpose of reactivation in our process is to replenish the oxygen in the lattice structure of the catalyst and to remove excess water which may hinder catalytic activity. The temperature range of 500° to 800° F. is sufficient to accomplish this purpose and also to remove any slight deposits which might have formed on the catalyst.

In a general embodiment of this aspect of our invention, the sour hydrocarbon feed is contacted with air and this distillate-air mixture is heated. Either the distillate, or the mixture may be preheated to the reaction temperature, or the mixture may be heated in the reaction vessel.

The distillate and air are passed into the reaction vessel wherein the oxygenated catalyst has been charged and appropriate conditions of temperature and pressure are maintained. The space velocity of the distillate-air mixture is, in general, dependent on the properties desired for the final poduct and the character of the feedstock, i.e., its mercaptan content. A suitable space velocity is in the range of from 1 to 50 LWHSV based on the total flow; we prefer the range of from 10 to 20 LWHSV. In general, the higher the mercaptan content of the feed and the greater the removal from the final product, the lower will be the space velocity.

The "sweetened" product together with excess air is passed from the catalyst bed into a suitable condenser, which is maintained at a temperature sufficiently low to condense any distillate vapors. The air is separated from the distillate and a non-corrosive, and "doctor" negative product is recovered.

In another embodiment of this invention, the cogelled catalytic composite described above and in Example I below has been found to have tremendous adsorptive capacity for sulfur, nitrogen and oxygen compounds as exemplified by thiophene, indole and benzaldehyde. We have found that although very little net adsorption of sulfur compounds occurs on the composite prepared by the process of the instant invention, this being explained by the capacity of the composite for the low temperature oxidation of indigenous mercaptan compounds, the composite described above has a greater adsorbent capacity for the oxygen, nitrogen and sulfur compounds exemplified by benzaldehyde, indole and thiophene than currently available adsorbents as, for example, molecular sieves. Example V, below clearly demonstrates the superiority of the composite of the instant invention over other adsorbents now available having utility for removal of nitrogen, oxygen and sulfur compounds from petroleum fractions.

The more detailed operation of our invention is illustrated by the following examples. There are, of course, many forms of this invention obvious to one skilled in the chemical art once the invention has been revealed and it will accordingly be understood that these examples are illustrative of the invention and not limitations thereon.

EXAMPLE I

To make a dilute, substantially cation-free silica sol, 2610 grams of sodium silicate solution (28.7 percent $SiO_2$) were mixed with 30 liters of water. The mixture was flowed through a bed of 3000 grams of protonated Amberlite IR–120 cation-exchange resin (a sulfonated styrene polymer cross-linked by a small proportion of divinylbenzene and manufactured by the Rohm and Haas Company). Dilute silica sol issued from the bed having a pH of 3.25. The bed was rinsed with an additional 5 liters of water, the liquid rinsed from the bed being added to the dilute silica sol.

In 5 liters of water were dissolved 842 grams of ferric chloride hexahydrate ($FeCl_3 \cdot 6H_2O$). The resulting solution was added with mixing to the dilute silica sol prepared as described above. To the resulting mixture was added, with constant mixing, in a flow stream, dilute aqueous ammonia (9 percent $NH_3$) in an amount sufficient to raise the pH of the resultant mixture to 7.8. This resulted in formation of a gel and the slurry of gel and liquid was allowed to stand over night. The gel was separated by filtration and was washed with water until the conductivity of the washings had fallen to a constant level. The washed gel was dried at 250° F. for 16 hours and formed into pellets 3/16 inches in diameter. These were calcined at 900° F. for 16 hours in air. The pore size distribution of the calcined pellets was determined by nitrogen adsorption measurement; 93.7 percent of the pore volume was in pores of radius less than 50 Angstroms, the average pore radius was determined to be 15.6 Angstroms and the surface area was found to be 367 meters$^2$ per gram. The sodium content of the calcined pellets was determined to be less than 0.01 percent. The calcined pellets were found by their X-ray diffraction pattern, to be an amorphous, non-crystalline mass comprising iron silica and oxygen.

EXAMPLE II

The above-described catalyst was employed in a process for the sweetening of sour hydrocarbons involving the low temperature selective oxidation of mercaptan sulfur and such compounds to disulfide sulfur. A fixed-bed reactor, 1 inch I.O. x 4 feet, was prepared by sandwiching 50 grams of the catalyst described above between 6 inch layers of quartz and placing a deadman on top of the bed. Before the catalyst was placed onstream, it was activated with air at atmospheric pressure for 5 hours at 800° F. The catalyst bed was allowed to cool to 80° F. and at this point the feed, pentane containing 0.1 percent ethyl mercaptan (500 p.p.m. sulfur), 0.005 percent dimethyl sulfide and 0.005 percent dimethyl disulfide, was charged upflow under 80 p.s.i.g. pressure into the reactor, the liquid weight hourly space velocity being 5.9. When the catalyst was completely wetted, 0.2 s.c.f. air/hour were admitted into the feed stream. A throughput weight/weight ratio of 49 was obtained at the point where a concentration of 25 p.p.m. ethyl mercaptan in the product was detected. The product pentane was water white and doctor sweet.

The performance of the catalyst has been judged by the length of the sweetening cycle, and hydrocarbon throughput-to-mercaptan breakthrough has been used as the response function. "Throughput" is a measurement of catalyst life and represents the weight of sour hydrocarbons treated over a weight of catalyst prior to mercaptan sulfur breakthrough at 25 p.p.m. into the product. The sweetened product was monitored continuously by an on-stream mercaptan analyzer. A product sample slip-stream was fed continuously through an electrolytic cell filled with a solution of ethanol, $NH_4NO_3$ and $NH_4OH$. Mercaptan concentration in the slip-stream was determined electrolytically by measuring the Ag ion generation rate required to maintain the cell at the millivolt level equivalent to a mercaptan titration end-point. As long as the catalyst remained active, the mercaptan content of the hydrocarbon slip-stream was less than 0.5 p.p.m. When the analyzer was not available, selected product cuts were taken for analysis to determine the mercaptan breakthrough curve.

EXAMPLE III

Under conditions identical to those of Example II above, except that the bed temperature was raised to 125° F. and the LWHSV was reduced to 5.1, a throughput of 94.3 weight was achieved at the point of 25 p.p.m., ethyl mercaptan breakthrough.

EXAMPLE IV

The reactor and catalyst bed were prepared and activated as in Example II above. The temperature of the catalyst bed was maintained at 125° F., the feed was pentane containing 0.2 percent ethyl mercaptan (1000 p.p.m. sulfur). At an air feed of 0.2 s.c.f./hour, a pressure of 80 p.s.i.g. and an LWHSV of 9.4, a throughput of 37 weight was achieved at a 10 p.p.m. of ethyl mercaptan breakthrough. The throughput to 25 p.p.m. ethyl mercaptan breakthrough was 41. This catalyst was regenerated at 700° F. with air at atmospheric pressure for 40 minutes and, under the same conditions as above, the throughput weight to 10 p.p.m. breakthrough was 39 and the throughput weight to 25 p.p.m. was 42.

EXAMPLE V

The catalyst described in Example I above was employed as an adsorbent for the removal of impurities from a secondary diesel reference fuel containing 1 percent each of thiophene, indole and benzaldehyde. The reactor and catalyst were prepared as in Example II above, but, prior to going onstream, the bed was activated with nitrogen for 4 hours at 800° F. and cooled to 80° F. After this pretreatment, the adsorbent bed was placed onstream, the described reference fuel being passed over the adsorbent, the liquid weight hourly space velocity being 1.18. The breakthrough concentrations were set at 0.1 percent sulfur, 0.05 percent nitrogen, and 0.1 percent aldehyde. The throughput to breakthrough, weight of liquid-weight of catalyst, was 2.0 for sulfur, more than 9 for nitrogen and more than 9 for aldehyde. In another run under conditions similar to those described above except that the LWHSV was higher, the throughput for sulfur dropped somewhat but the throughput for nitrogen and aldehyde rose significantly. These data as well as a comparison of other adsorbents are summarized in Table I below.

TABLE I.—COMPARISON OF ADSORBENTS FOR IMPURITY REMOVAL FROM A DIESEL FUEL

Charge: T-15 secondary diesel reference fuel containing 1% thiophene, indole, and benzaldehyde each by Wt.
Conditions: Room temperature adsorption
[Bed activated at 800° F.]

| Adsorbent | Volume, ml. | LWHSV | Throughput to breakthrough, percent | | Wt./wt. aldehyde, percent |
|---|---|---|---|---|---|
| | | | Sulfur | Nitrogen | |
| Breakthrough concentration | | | 0.1 | 0.05 | 0.1 |
| 13×molecular sieves | 400 | 1.16 | 0.3 | 0.9 | 1.8 |
| Catalyst of Example I | 300 | 1.18 | 2.0 | >9 | >9 |
| Do | 320 | 1.42 | 1.1 | >12.1 | ~12.3 |
| 5% K on Pseudoboehmite II | 350 | 0.84 | 0.3 | >5.4 | >5.4 |
| 5% Cu on SiO-MgO | 400 | 0.92 | 0.8 | 4 | ~2.5 |
| Activated carbon | 400 | 1.27 | 0.9 | 3.5 | 2.7 |
| 5% Ti on silica-alumina | 400 | 0.92 | 0.1 | 1.1 | 0.9 |
| 5% As on Pseudoboehmite I | 400 | 1.22 | 0.7 | 3.4 | 3.5 |
| 5% Cr on activated carbon | 400 | 1.78 | 0.1 | 1.7 | 4.4 |
| 5% Ni on 13× molecular sieves [1] | 400 | 0.50 | 0.14 | 0.61 | 1.3 |

[1] Contaminants 2% by wt. in charge.

EXAMPLE VI

A cogelled precipitate was prepared and dried as in Example I above. 210.3 grams (350 cc.) of this dried gel were calcined by heating in air to 1000° F. in six hours and holding at 1000° F. for ten hours.

A selenic acid solution having a specific gravity of 1.04 and 10.4 percent equivalent of $SeO_3$ was prepared by dissolving 20.9 grams of $H_2SeO_4$ in water and diluting it to 170 ml. (176.3 grams). The 210.3 grams of calcined catalytic composite were broken up and impregnated with the selenic acid solution to incipient wetness. This impregnated material was oven dried for 24 hours at 250° F. and calcined in air in an electric muffle furnace brought to 700° F. in four hours and maintained at this temperature for 12 hours. The incipient wetness adsorptivity is 0.81 ml. of solution per gram of calcined composite. The calculated deposit is 5.0 percent Se or 8.02 percent $SeO_3$. The selenium is present on the calcined catalyst as $SeO_3$.

The catalyst described above was employed in a process for the low temperature selective oxidation of mercaptan sulfur to disulfide sulfur. A fixed-bed reactor was charged and activated as in Example II above. When the reactor had cooled to 80° F. the feed, normal pentane containing 0.2 percent of ethyl mercaptan (1000 p.p.m. sulfur) was charged upflow under atmospheric pressure, the LWHSV being 9.4. Air was added to the feed stream so as to yield 7.12 moles of oxygen per mole of ethyl mercaptan. The throughput weight to 25 p.p.m. breakthrough was 175.

EXAMPLE VII

A run was made under the identical conditions as described in Example VI except that no air or oxygen was added to the feed stream. The throughput weight to 25 p.p.m. breakthrough was 85.

EXAMPLE VIII

A fixed-bed reactor was charged with 50 grams of the selenium-promoted catalyst described in Example VI above and activated with air at 800° F. for 5 hours. When the temperature of the catalyst bed had dropped to 120° F., the feed, heptane containing 0.1 percent of butyl mercaptan, was charged upflow under atmospheric pressure into the reactor, the LWHSV being 10.1 air was added to the feed stream so as to yield 9.8 moles of oxygen per mole of butyl mercaptan. The throughput weight to 25 p.p.m. of butyl mercaptan breakthrough was 91.

EXAMPLE IX 169.5 grams (300 cc.) of cogelled precipitate prepared and dried as in Example I above were calcined in air by heating to 1000° F. in six hours and holding the temperature at 1000° F. for ten hours.

A potassium nitrite solution having a specific gravity of 1.02 and 1.84 percent equivalent of $K_2O$ was prepared by dissolving 3.74 grams of $KNO_2$ in water and diluting it to 111 ml. (112.6 grams).

The 169.5 grams of calcined composite were broken up and impregnated with the $KNO_2$ solution to incipient wetness. This wet material was oven dried for 24 hours at 250° F. and calcined in air in an electric muffle furnace by heating to 1000° F. for another ten hours. The incipient wetness adsorptivity is 0.65 ml. of solution per gram of composite. The calculated deposit is 1 percent potassium or 1.21 percent $K_2O$. Potassium is present on the calcined catalyst as $K_2O$.

The catalyst described above was employed in a process for sweetening a doctor sour hydrocarbon. A reactor was charged with 50 grams of potassium-promoted catalyst and activated in the manner described in Example II above. The feed, n-pentane containing 0.2 percent of ethyl mercaptan, was charged upflow into the reactor at atmospheric pressure, at an LWHSV of 9.4 when the catalyst bed had cooled to 80° F. Oxygen was added to the feed stream in the form of air at the rate of 0.2 s.c.f./hour. The throughput weight to 25 p.p.m. breakthrough was 72.

EXAMPLE X

The reactor was charged and activated as in Example IX above. When the catalyst bed had cooled to 125° F. the feed, pentane containing 0.2 percent of ethyl mercaptan was charged upflow into the reactor, the LWHSV being 3.75. Air was added to the feed stream at the rate of 0.2 s.c.f./hour. under 80 p.s.i.g. pressure. The throughput weight to 25 p.p.m. mercaptan breakthrough was 30.9.

Obviously, many modications and variations of the invention, as hereinabove set forth, can be made without departing from the spirit and scope thereof, and therefore only such limitations should be imposed as are indicated in the appended claims.

We claim:

1. A process for the oxidative sweetening of sour hydrocarbons which comprises contacting a sour hydrocarbon with the calcined cogelled catalytic composite having lattice oxygen available for said oxidative sweetening reaction, said composite resulting from the steps of forming a solution of a substantially alkali metal-free silica sol and an iron group metal salt, cogelling said solution to form a cogelled precipitate containing said iron group metal therein as the metal hydroxide, drying said cogelled precipitate, and calcining said dried precipitate at a temperature of at least about 800° F.

2. A process in accordance with claim 1 wherein the iron group metal is iron.

3. A process in accordance with claim 1 wherein the composite is promoted with an alkali metal, selenium or mixtures thereof deposited on said composite after said calcination.

4. A process in accordance with claim 1 wherein the sour hydrocarbon is contacted with said composite in the presence of oxygen in addition to said lattice oxygen, said additional oxygen added by means of a gas containing free oxygen.

5. A process in accordance with claim 4 wherein the iron group metal is iron in an amount of from about 10 to about 60 weight percent of said composite.

6. A process in accordance with claim 5 wherein said composite is promoted with from about 0.1 to about 10 percent of an alkali metal, selenium or mixtures thereof deposited on said composite after said calcination.

7. A process in accordance with claim 6 carried out at a temperature from about 0° to about 200° F. and a pressure from about 0 to about 500 p.s.i.g.

References Cited

UNITED STATES PATENTS 2,915,460  12/1959  Mills et al. _____ 208—189
2,951,888  9/1960  Carr _____ 260—683.65

DELBERT E. GANTZ, Primary Examiner

G. J. CRASANAKIS, Assistant Examiner

U.S. Cl. X.R.

252—452, 459